Figure 1:
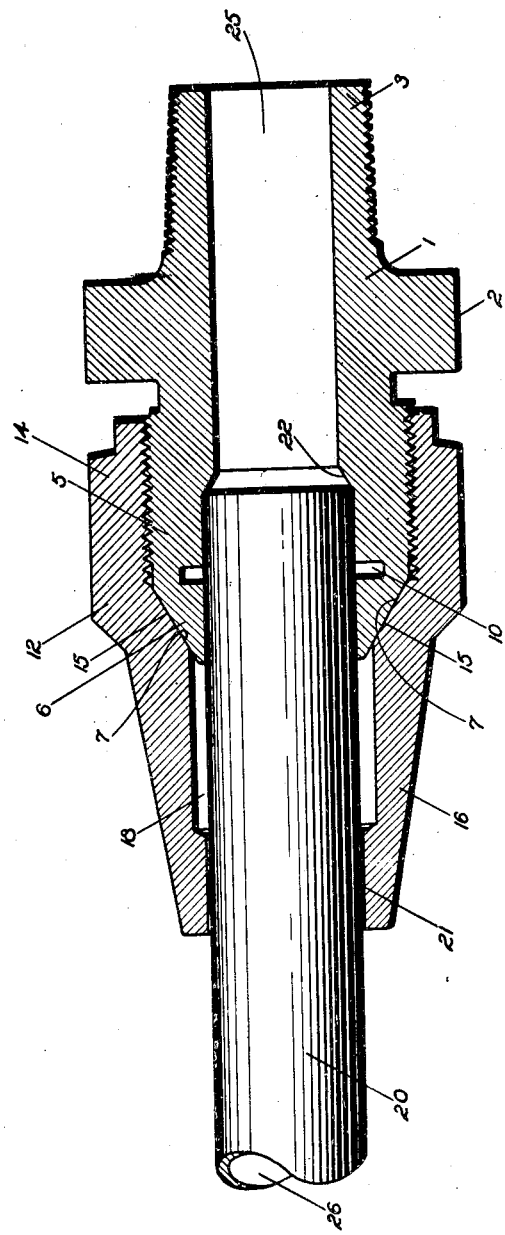

Jan. 11, 1949.   R. CARIGNAN   2,458,833
SPRING COMPRESSION TUBING AND PIPE CONNECTION
Filed Nov. 7, 1947   2 Sheets-Sheet 1

INVENTOR.
Raymond Carignan
BY James R. Hodder
Attorney

Jan. 11, 1949.   R. CARIGNAN   2,458,833
SPRING COMPRESSION TUBING AND PIPE CONNECTION
Filed Nov. 7, 1947   2 Sheets-Sheet 2
Fig. 2
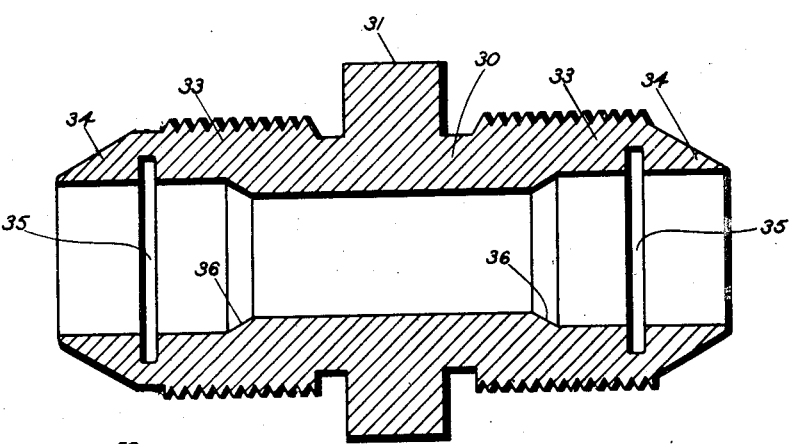
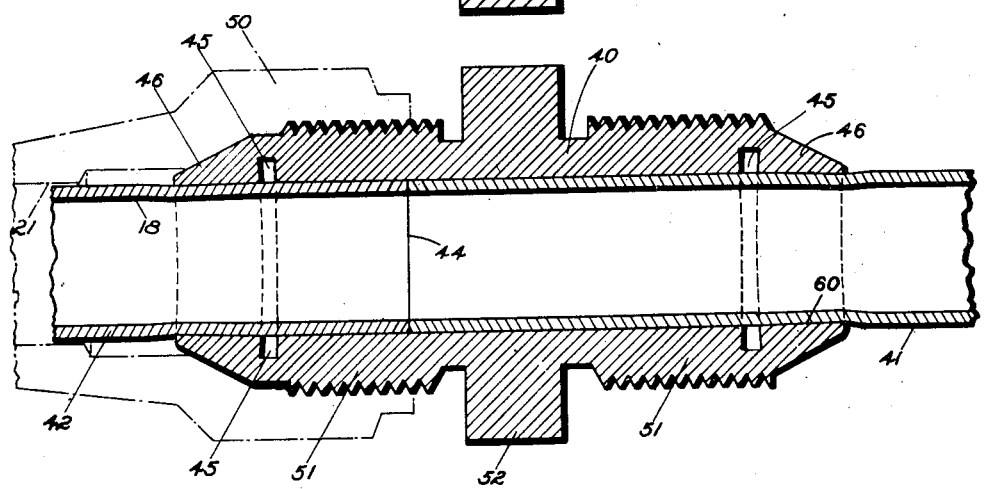
Fig. 3
INVENTOR.
Raymond Carignan
BY James R. Hodder
Attorney Patented Jan. 11, 1949

2,458,833

UNITED STATES PATENT OFFICE 2,458,833

SPRING COMPRESSION TUBING AND PIPE CONNECTION

Raymond Carignan, Bradford, Vt., assignor, by mesne assignments, to Mer-Wall Enterprises, Incorporated, Wallingford, Conn., a corporation of Connecticut Application November 7, 1947, Serial No. 784,638

2 Claims. (Cl. 285—123)

My present invention is a novel and improved method of and device for uniting the end of a pipe or tube to a fixture, or to join the ends of two pipes by an efficient, quick-acting, spring-compressing and locking means.

Heretofore various apparatus have been devised for attaching the end of a pipe to a fixture or for coupling two pipe ends together by wedging a nut and flange, or the like, about the same, or by means of clamping a connecting element either with or without yielding glands or other liquid-tight constructions.

Such prior devices have usually required a multiplicity of parts, round joints, interlocking bearings, and similar complex arrangements and have often proved unsatisfactory as well as expensive, and frequently lack an effective sealing grip and locking action.

My present invention is directed to obviate the difficulties above briefly outlined and to provide a strong, simple, and efficient pipe-engaging and locking means which will insure a compressive tight sealing and a firm gripping operation by the rotative action of a single nut which will, by a progressive wedging action, distort the wedging portion of a clamping flange, and thus interlock the nut and flange in pressure-tight relation about the end of the pipe fitted therebetween.

A further and important feature consists in the construction and arrangement of the wedging flange which is formed integral with the threaded portion, on which threaded portion a cooperative nut is fitted with the wedged flange surface adapted to yield relatively with the threaded portion and thereby compress and clamp the pipe fitted therein.

An additional important feature consists in the construction and arrangement of the clamping nut wherein the pipe is fitted thru a guiding and freely sliding part of the nut, and thereafter clearance is provided between the outside of the pipe and the inside of the nut so that an automatic self-seating feature for the end portion of the pipe within the nut is effected, thus insuring the smooth and even seating of the wedge portion of the flange on the cooperating fixture.

Referring to the drawings illustrating a preferred movement of my present invention:

Fig. 1 is a view partly in cross-section of the threaded nut, wedging flange on one end of a fixture, and a pipe clamped therein.

Fig. 2 is a view also in cross-section of a pipe connecting fixture with a wedging flange on each end to connect two pipes together; and Fig. 3 is a corresponding view in cross-section showing two pipe ends fitted in the connecting fixture and illustrating the distorting action of the wedging flanges on the adjacent portions of the pipes, considerably over-drawn to more fully illustrate the distortion and spring feature.

Referring to Fig. 1, I have illustrated a typical fixture 1, having a hexagonal or square center portion 2 adapted to receive a wrench and a threaded portion 3 to fit into any desired threaded connecting article. At the opposite end of the fixture 1 I provide a threaded section 5, a wedging flange portion 6 being integral with the section 5 but formed with an internal groove 10 to thus provide capacity for the wedging flange portion 6 to be sprung or distorted relatively with the rest of the fixture.

A nut 12 is formed with a cooperating threaded portion 14 to fit upon the threaded part 5, said nut having a wedging face 15 to bear upon and cooperating with the corresponding wedging face 7 on the flange 6. The nut 5 has a tapered section 16 with an interior diameter 18 substantially greater than that of the exterior diameter of the pipe 20 to be fitted therein, and the nut 16 has its opening 21 of a suitable diameter to provide a sliding fit for the pipe 20 therein. Thus the pipe 20 has its end portion fitted thru the sliding opening 21 in the tapered portion 16 of the nut 14, or the nut is slid thereover and thereupon the fixture 1 with the end of the pipe 20 within the flange 6 and threaded part 5 of the fixture 1.

Thus assembled, the nut 14 is rotated and the cooperating threads draw the nut and fixture together until the cooperating wedging surfaces 15 and 7 are in contact; whereupon continued relative rotation of the nut 14 and fixture 1 will effect a tightening of the flange 7 against, upon, and into the outer surface of the pipe 20, thereby distorting the flange to a limited extent, which is permitted by the internal groove 10.

If desired, the fixture 1 may be provided with a bevelled face 22 which would constitute a stop for the end of the pipe 1 but this is not essential, although the construction as shown in Fig. 1 effects a full capacity flow thru the open center 25 of the fixture 1 and the interior 26 of the pipe 20, the extent of the top being substantially equal to that of the thickness of the pipe 20.

Referring to Fig. 2, I have herein illustrated a union or coupling comprising the coupling member 30 formed with the wrench-receiving square, hexagonal, or the like boss 31 and having at opposite ends threaded portions 33 and 33, each terminating in a wedging flange 34—34, and each such flange is partially separated from the adjacent portion 33 of the connecting member by an internal groove 35 formed or cut into the connecting member from the internal diameter 36 of the opening thru the member 30. In this form, the baffle stops 36—36 to receive the end of pipes to be fitted in and connected together, with stops being equivalent to that already described as 22 in Fig. 1. Connecting nuts similar to the nut 5 already described are fitted over the pipe ends and threaded on to the connecting element 33, effecting a wedging action on each pipe, as will be appreciated.

In Fig. 3 I have illustrated a further modification wherein the connecting element 40 has a smooth bore or opening thru the center to receive the ends of pipes 41 and 42, which ends may abut directly against each other as indicated at 44 in any interior position within the grooves 45—45 to thereby allow the clamping flanges 46—46 to be compressed against the adjacent portion of the respective pipes, as clearly shown.

The cooperating nut would be identical with that illustrated and described in Fig. 1 and is indicated in dotted lines at 50, being threaded on the threaded part 51 at each side of the wrench-receiving hex or boss 52. In this form, I have overdrawn the distortion of the wedging flange 46 in this compression about the adjacent portion of the pipe ends to illustrate more clearly the clamping and locking or biting action caused by the wedging flange being forced into the pipe, as indicated for example at 60, Fig. 3.

It will thus be appreciated that I am enabled to secure a firm, rigid, quick clamping action by the relative rotation of the threaded nut on the cooperating threaded portion of the fixture, as in Fig. 1, or on the pipe connector as shown in Figs. 2 and 3, either the nut can be rotated or the flange-carrying portion can be rotated to effect the wedging and clamping action of the cooperating surfaces on the flange, which flange is allowed to yield because of the internal groove partially separating it from the main part of the fixture or connector.

Also the pipe passing thru the closely fitting sliding portion 21 of the nut into the clearance provided by the enlarged diameter of the recess 18 permits the end of the pipe and the entering wedging portion of the flange to automatically self-adjust or self-seat their surfaces in smooth, even, and uniform contact, thereby insuring a firm sealing action entirely around the periphery of the pipe and insuring a firm contact as the threaded portions of the nut and fixture are rotated into final clamping position.

I claim:

1. Spring compression pipe coupling of the kind described, comprising a flanged member having a threaded portion and a tapered wedge portion adapted to encircle the pipe to be connected therewith, an internal circular recess between said threaded and tapered portions, in combination with a nut adapted to be threaded on said threaded flange, and with a cooperating bevelled bearing surface to compress said wedge portion into pipe-clamping action.

2. A pipe coupling of the kind described, comprising a member adapted to receive the end portions of abutting pipes fitted within said member, an exterior threaded portion on each end of said coupling, together with tapered end portions at each end of said coupling, an internal circular recess adjacent each tapered end portion where the same adjoins the threaded portion, in combination with threaded nuts tapered to cooperate with each bevelled end portion of said connecting member to clamp the end portions about the pipes fitted therein, whereby said end portions are compressed into pressure-tight clamping action on said respective pipe ends.

RAYMOND CARIGNAN.

REFERENCES CITED

The following references are of record in the file of this patent:

UNITED STATES PATENTS

| Number | Name | Date |
| --- | --- | --- |
| 502,733 | Lister | Aug. 8, 1893 |
| 1,328,612 | Becker | Jan. 20, 1920 |
| 1,872,536 | Weatherhead | Aug. 16, 1932 |